No. 610,777. Patented Sept. 13, 1898.
J. G. VENABLE.
NUT AND BOLT LOCK.
(Application filed July 2, 1897.)

(No Model.)

Witnesses
Harry L. Amer.
Victor J. Evans.

Inventor
Joseph G. Venable.
by John Wedderburn
Attorney

THE NORRIS PETERS CO., PHOTO-LITHO., WASHINGTON, D. C.

UNITED STATES PATENT OFFICE.

JOSEPH G. VENABLE, OF BROADWELL, KENTUCKY.

NUT AND BOLT LOCK.

SPECIFICATION forming part of Letters Patent No. 610,777, dated September 13, 1898.

Application filed July 2, 1897. Serial No. 643,271. (No model.)

*To all whom it may concern:*

Be it known that I, JOSEPH G. VENABLE, of Broadwell, in the county of Harrison and State of Kentucky, have invented certain new and useful Improvements in Nut and Bolt Locks; and I do hereby declare the following to be a full, clear, and exact description of the invention, such as will enable others skilled in the art to which it appertains to make and use the same.

My invention relates to a nut and bolt lock for preventing accidental relative movement of said parts after they have been properly adjusted.

It consists in the combination, with a bolt provided on its threaded end with one or more longitudinal grooves or slots crossing the screw-threads at the outer portion of said end only, of a nut having a radial slot extending through its threaded bore to the outer face or side of the nut and an angular key engaging said grooved end of the bolt and the slotted nut, as hereinafter described and claimed.

Figure 1:
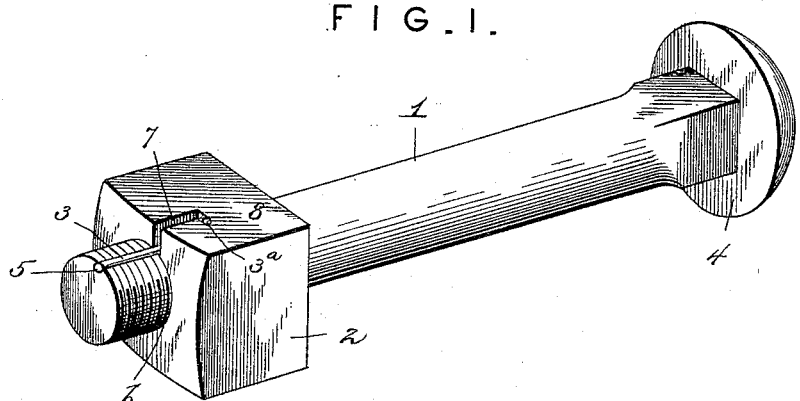
Figure 2:
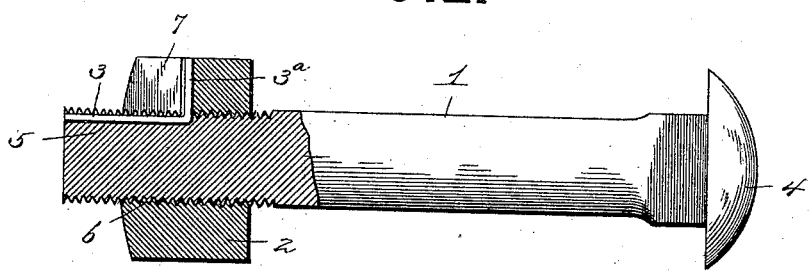
Figure 3:
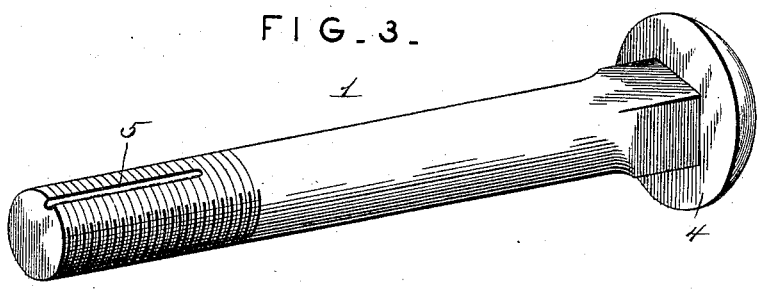
Figure 4:
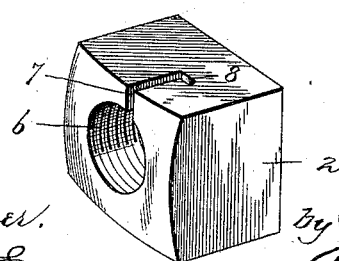
Figure 5:
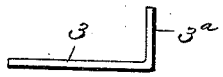

In the accompanying drawings, Figure 1 is a perspective view of the bolt, nut, and key. Fig. 2 represents a longitudinal section through the bolt and nut, showing the angular key in side elevation. Fig. 3 is a perspective view of the bolt. Fig. 4, a similar view of the nut; and Fig. 5, a similar view of the angular key, the last-named views showing the parts separated.

1 indicates the bolt, 2 the nut, and 3 the angular key. The bolt is provided with the usual head 4, angular or otherwise in outline, according to the use to which it is to be applied, and 5 indicates a longitudinal groove or slot extending from the point end of the bolt and crossing a portion only of the threads on said end—namely, those at the outer end thereof—leaving the inner portions of the threads untouched for giving to the nut engaging said bolt a grasp upon the entire periphery of the latter and avoiding the weakening of the bolt at that point. The nut is provided with a radial slot (indicated at 7) extending from its screw-threaded bore 6 to the periphery of the nut and open upon the outer face of the nut, as shown. This slot extends inward one-third of the thickness of the nut, more or less, and terminates at its inner end in an angular extension, (indicated at 8,) which may be formed upon either or both sides of the inner end of the slot 7, preferably, however, upon that side which will be forward in the movement of the nut in tightening the same, said angular extension forming a seat for the upright arm $3^a$ of the key 3. The groove 5 in the bolt 1 is made of sufficient depth to allow the arm 3 of the key engaging said groove to lie below the threads of the nut, so that the latter in being turned upon the bolt 1 will pass freely over it.

In operation, after the nut has been turned upon the bolt and given the desired adjustment, so that it rests within or partly beyond the groove 5 therein in such manner as to give the nut a full bearing at its inner side upon the bolt 1, the slot 7 is brought into alinement with the groove or slot 5, after which the angular key is inserted through the slot 7, its arm 3 resting in the groove 5 and the arm $3^a$ within the slot 7 passing through the latter into the key-seat 8, after which by slightly backing the nut upon the bolt the key is effectually locked in place and prevents any further movement of the nut relative to the bolt.

Additional slots or grooves may be formed in the threaded end of the bolt, and additional slots also may be formed in the nut 2, which may be of either the rectangular form shown or any of the usual polygonal shapes employed. By increasing the number of slots a more accurate adjustment of the nut upon the bolt can be had without giving it undue tension thereon or without leaving it so loose upon the bolt as not to properly bind the parts secured thereby.

By the construction described a simple and effective lock is provided and one in which the key may be applied by hand without the aid of instruments for that purpose other than the wrench required for the adjustment of the nut upon the bolt. By the formation of the slot 5 in the point end of the bolt the weakening of the bolt at the point where the nut when properly adjusted rests is avoided.

Having thus described the invention, what I claim as new, and desire to secure by Letters Patent, is—

The combination with a bolt having a longitudinal slot or groove extending from its screw-threaded end across a portion only of its screw-threads, of a nut having a radial slot extending from its threaded bore to its periphery and from its outer face inward, and terminating at its inner end in an angular extension of the key-slot at right angles to the main portion thereof and forming a radial key-seat, and a rigid angular key adapted to be inserted in the slot in the nut, one arm of said key extending through the nut and engaging the angular key-seat therein, and the other extending outward from said angular key-seat through the groove in the bolt toward the screw-threaded end thereof, substantially as described.

In testimony whereof I have signed this specification in the presence of two subscribing witnesses.

JOSEPH G. VENABLE.

Witnesses:
A. G. BUCKNER,
C. S. McMILLIN.